(12) United States Patent
Hasseler

(10) Patent No.: US 7,904,347 B2
(45) Date of Patent: Mar. 8, 2011

(54) SYSTEMS AND METHODS FOR CONDUCTING AN AUCTION

(75) Inventor: Manfred Hasseler, Hechendorf (DE)

(73) Assignee: Entertainment Shopping AG, Munich (DE)

( * ) Notice: Subject to any disclaimer, the term of this patent is extended or adjusted under 35 U.S.C. 154(b) by 767 days.

(21) Appl. No.: 11/768,364

(22) Filed: Jun. 26, 2007

(65) Prior Publication Data

US 2008/0010077 A1    Jan. 10, 2008

Related U.S. Application Data

(63) Continuation-in-part of application No. 11/421,100, filed on May 31, 2006.

(30) Foreign Application Priority Data

Jun. 1, 2005   (EP) ..................................... 05011774

(51) Int. Cl.
*G06Q 30/00* (2006.01)
(52) U.S. Cl. .......................... 705/26.3; 705/27.1; 705/37
(58) Field of Classification Search .................... 705/26, 705/27, 37
See application file for complete search history.

(56) References Cited

U.S. PATENT DOCUMENTS

| 7,152,042 B1 * | 12/2006 | Arkes ............................... 705/37 |
| 2004/0193529 A1 * | 9/2004 | Asher et al. ..................... 705/37 |

OTHER PUBLICATIONS

"Flashbid Opens Online Auction—Changing Everything You Knew About Online Shopping," PR Newswire, New York: May 10, 2005, p. 1 [retrieved on Apr. 7, 2010].*
"Want to buy a brand new plasma TV for Pounds 1.55? Then enter the weirdword of reverse auctions," Sunday Times, London (UK): Jul. 4, 2004, p. 14 [retrieved on Apr. 7, 2010].*
"Strategic Insights: Auction Games," by Shannon Appelcline, http://www.skotos.net/articles/TTnT_/TTnT_144.phtml, posted Mar. 18, 2004 [retrieved on Apr. 8, 2010].*
"Entertainment Shopping Portal Swoopo Launches US-Site; Successful German Internet Idea Comes to America," PR Newswire, New York: Sep. 16, 2008. [retrieved on Jul. 15, 2010].*
TeleBid.de FAQ, dated Dec. 31, 2005 by web.archive.org, originally retrieved from the Internet on Aug. 3, 2010, http://web.archive.org/web/20051231001756/http://www.telebid.de/index.php?fs=show &show=faq.

* cited by examiner

*Primary Examiner* — Yogesh C Garg
*Assistant Examiner* — Anne M Georgalas

(57) ABSTRACT

A method includes receiving, prior to a first time, a first signal indicating that a first user is initiating an auction for an item. A second signal indicating that a second user has purchased a first set of bids costing a first amount and a third signal indicating that a third user has purchased a second set of bids costing a second amount are received prior to the first time. Multiple signals indicating that the second user has used the first set of bids and that the third user has used the second set of bids in the auction for the item are received after the first time but before a second time. The item is awarded to the second user at the second time. The first user is provided with a portion of the first amount and a portion of the second amount after the second time.

16 Claims, No Drawings

SYSTEMS AND METHODS FOR CONDUCTING AN AUCTION

CROSS REFERENCE TO RELATED APPLICATIONS

This is a continuation-in-part of application Ser. No. 11/421,100 file May 31, 2006 and incorporated here by reference, which claims priority from European patent application no. 05 011 774.6 filed Jun. 1, 2005, which priority claim is repeated here.

FIELD OF THE INVENTION

The present invention concerns a method for the automatic determination of an end value, in particular in an Internet auction.

BACKGROUND TO THE INVENTION

Methods for the determination of end values are known from the prior art, in which starting from a start value input signals can be received within a previously determined time period, which signals increase the start value by either a specific or a freely selectable value. After elapse of the time period the instantaneous value determined up to that point is outputted as an end value. Such a system is, for example, of known art from the Internet platform eBay, in which the goods of third parties can be auctioned by third parties. Here electronic bids entered via a bidding agent serve as input signals for the method of known art. Start value, instantaneous value and end value correspond to amounts of money, wherein the end value is a purchase price. The increase of the instantaneous value takes place by a step prescribed by the system, wherein the bidding agent of known art bids up to an end value set by a user.

What is disadvantageous in this system is that the determination of the end value takes place in a very uniform manner and is therefore very calculable.

The object of the present invention is therefore to specify a system that avoids the disadvantages of the prior art.

SHORT DESCRIPTION OF THE INVENTION

This object is achieved by means of a method with the following steps:
a) Start with a start value and wait for an input signal,
b) On receipt of a first input signal a instantaneous value is determined by increasing the start value and a timer is started, which prescribes a time period,
c) On receipt of each further input signal the instantaneous value is again increased and the time is reset,
d) In the absence of an input signal within the time period prescribed by the timer the instantaneous value is outputted as an end value.

In that according to the invention no provision is made for a predetermined total time for the determination, the uniformity and calculability of the determination is significantly reduced. This leads to greater attention being paid to the method, so that operating errors do not occur, or their occurrence is clearly reduced. In what follows under method or method cycle is primarily understood an Internet auction.

By means of the inventive measure in which start value and/or length of the time period given by the timer can be pre-selected, and/or step a) takes place controlled by the timer, the calculability is even further reduced. By means of the ability to pre-select the start value the latter can be well matched to a desired end value. If high end values are desired larger start values are selected, and vice versa. Under start value is in particular understood a start price, under end value an end price, for goods auctioned in an Internet auction. Shorter time periods accelerate the method, longer time periods slow it down. This inventive measure also enables with advantage the matching of the method to a desired end price, since high end prices are more easily achieved with an accelerated method. Provision is made according to the invention that certain auctions progress faster than others, wherein these auctions can be linked to specific times of day. In order to configure the level of utilisation of the method over the day as evenly as possible, faster auctions can be executed in the earlier morning, midday or later evening hours. At these times of day further utilisation incentives can be provided, as are still to be embodied further below.

In one configuration of the invention provision is made that the instantaneous value is always increased by a constant amount. In this manner the number of parameters that can be influenced by the user is reduced, so that the latter can concentrate totally on the instantaneous value, timer, and the entering of input signals.

In that a threshold value is prescribed for the instantaneous value, at the arrival of which the instantaneous value is outputted as an end value, the calculability of the method is reduced. In conjunction with a method duration that is not prescribed an even greater attention to the method is achieved. Provision is also made that with the arrival at the prescribed threshold value a random generator is started, which defines an end value to be achieved from the instantaneous value, with the attainment of which the method is ended.

If after the receipt of an input signal an output signal is outputted, for example in the form of an electronic message such as an e-mail or SMS, it is preferentially accomplished that the user of the method is informed of the level of the instantaneous value. He likewise receives confirmation to the effect that the method is working reliably.

In one configuration of the invention provision is made that an output signal is outputted before the elapse of the time period given by the timer.

If the person using the method receives a further output signal, it is with advantage accomplished that the method can be pursued further in spite of an inadvertent operating error, and is not prematurely ended by an inadvertent oversight of the elapse of the time period.

A user receives via a print medium, telephone promotion, an online medium or in another manner information regarding the start of an auction according to the invention and the art and manner of its progress. Furthermore he receives information as to how he can enter a bid within the auction. For example, the auction starts on a specific day at a specific time with a start price of 0.00 EUR. As soon as a bid occurs, for example by means of a telephone call, an SMS, a postcard, a bidding agent or a click on a website, the method according to the invention determines in real time an instantaneous value, by adding a specific amount that remains the same, for example 0.10 EUR, to the start value. This instantaneous value is assigned to the user entering the bid and/or his bidding agent, for example by means of automatic call number transfer or manual input with subsequent matching to a log-in on a web site. The method outputs an output signal, for example in the form of an e-mail or SMS, to the user, who has previously specified his e-mail address or his address. In this manner the user is informed that his input signal has been processed according to the method. The method can be further automated if the user when sending the first input signal receives a log-in with pass word so that his further bids can be more quickly assigned. At the same time as the input signal is processed a timer is started, which timer prescribes a time period. As an option it is also possible not to inform the users of the time period so that the calculability reduces and thus the users' attentiveness increases. With each further bid by other users within the prescribed time period a new instantaneous value is determined in the same manner; this value is assigned to the bidder in question and is greater than the previous instantaneous value by the amount of 0.10 EUR.

According to the invention the method also outputs an output signal when the elapse of the prescribed time period is imminent. This output signal is directed to all users, or to a selection of them, for example to those who have entered the last ten input signals. By means of this output signal the method gives to the users the option of being able to using the method again, and ensures that the users are not refraining from further use as a result of an oversight. If no further input signal is received in the method the latter is ended by output of the valid instantaneous value as an end value after the elapse of the prescribed time period. The method transmits an output signal with which the end value is sent to the last user so that a purchase contract can be completed.

DETAILED DESCRIPTION OF THE INVENTION

In what follows a series of specific details are disclosed for the execution of an Internet auction for purposes of clarification, in order to ensure a sound understanding of the invention. To the person skilled in the art it is, however, clear that the invention can also be executed without some of these details.

A first step of the computer-implemented online auction belongs to the invention, namely the setting up known per se of an auction on the Internet with details of a start value relating to the purchase price, and an illustration and description of the product, as necessary. The fact that users, in other words potential bidders, are informed of the start of this and further auctions belongs to the method according to the invention. This takes place in the preferred form of embodiment online via a monitor of the user, who is connected via the Internet with a server. The notification can likewise according to the invention take place via SMS, a phone call, or similar means. The auction starts when a first bid has been entered, wherein the entering of the bid takes place either by telephone, SMS, a click on an Internet site or via a bidding program. The ways in which the bids are entered are according to the invention not of the same value with regard to their bidding sequence. After entry of the first bid a timer begins to run, which counts down a prescribed time period, for example 40 seconds. If a further bid is entered within this time period the timer is reset, the 40 seconds start to run again, and the instantaneous value is increased by a prescribed amount, for example 0.10 or 0.01 currency units. The user can therefore not directly raise the purchase price by an amount specified by him, but only by an amount prescribed by the auction operator. The bidding program according to the invention is an algorithm, in which a lower and an upper limit for the instantaneous value can be selected by the bidder, within which the bidding program bids. The bidder must furthermore specify how many bids within this period can be entered by the bidding program. These bids must be purchased by the bidder from the auction operator before the start of the auction in the form of bid packages. Here the bidding program can only be configured once by the bidder. This increases the tension of the bidder, increasing the user's attentiveness and enjoyment.

In addition to the one-off parameterisation of his bidding program, provision is made for the bidder in the invention that the former for purposes of balance can activate an unlimited number of bidding programs per auction; together, however, these cannot exceed a maximum number of bids prescribed by the auction operator. Preferably this number of bids is 150. In this manner it is ensured that no bidder enters bids that he cannot support economically. Furthermore provision is made that the bidder in an auction holds in credit bids not used by his bidding program. He can use these subsequently in other auctions for other bidding programs. According to the invention provision is therefore made for a price-wise decoupling of bid entering and bid height, and for no direct dependence of the goods value on the auction end price. In this manner the costs for the bidder are distributed on a broader basis. His auction strategies become more diverse, since he can distribute his numbers of entered bids flexibly between various bidding programs in the same or in different auctions.

If, as provided for by the invention, a plurality of bidders in one auction in each case use one or a plurality of bidding programs, then a ranking or sequence is assigned to these. In this manner it is possible to actuate various bidding strategies so that a bidder can exert a greater influence on the auction. The sequence of the bids corresponds thereby to the sequence of activation of the bidding programs by the various bidders. A bidding programme can accordingly only then re-enter a bid when all subordinate bidding programs have each entered a bid and neither the number of bids used nor the upper limit of the instantaneous value, up to which the bidding program bids, is attained or exceeded. The method according to the invention calculates thereby from the parameters of the bidding programs participating in the auction a probable end value that it can assign to a specific bidding program. The method can generate an output signal that displays this projected value on a monitor, or sends it by SMS or telephone call to the bidders. In this manner an exact determination of the auction winner is possible and the probable losers can still engage in the auction event in an opportune manner.

According to the invention provision is here made that a bid that has not been entered by a bidding program sets the instantaneous value to the projected end value plus an increment. In this manner the bidder who has entered this bid by a click on an Internet site or a phone call on a specific telephone number has a greater influence on the auction, since he sets himself at the end of the sequence of the bidding programs and thus bids above these. Such a bidder is a probable auction winner, unless the other bidders use new, and freshly parameterised bidding programs.

To prevent the blockade of the method by multiple bidders provision is made according to the invention that a serial number is generated per bidder, which is increased for each auction successfully run for this bidder and is reduced for the expiry of a specific time period, wherein the bidder when attaining a threshold value for the serial number can no longer participate in any new auction until the serial number falls below the threshold value once again.

Provision is likewise made for auctions whose end value need not be paid for. By this means the method and the auctions become more attractive. The bidder must only pay money for the purchase of the bids.

Provision is made for auctions in which the instantaneous value oscillates by means of entered bids between a lower limit 0 and an upper limit fixed by the auction operator, and wherein is after each arrival at a limit the length of the time interval prescribed by the timer is reduced by an amount that remains the same, preferably 10 seconds. By this means a time spiral is created that allows an auction to become faster the longer it lasts. If no more bids are received within the prescribed time period the auction ends as before. In this auction variant of the method the tension remains with the bidder, wherein in addition he can better estimate his costs, since the auction can never move above the upper limit value.

Provision is made for auctions in which the instantaneous value is immediately set to the projected value and only then is the timer started. By this means the progress of an auction and thus of the method is significantly accelerated. At the start the height that the instantaneous value would be after entry of all possible bids of the bidding programs is determined by means of the activated bidding programs and their parameters. This value then forms the start value for the auction, at which the timer starts and allows the pre-selected time period to elapse.

Furthermore provision is made according to the invention that the method starts at specific times of day at which the purchase price achieved in the auction is only the price of the bids set. Thus by the granting of economic advantages for the bidder an even utilisation of the method distributed over the day is achieved, so that loading peaks, which for example could reduce the data transfer rate on the Internet, do not occur.

Finally provision is made that the bidder per bid purchased receives a number of free bids, in particular 0.1 free bids. This represents an incentive for the bidder to take part in auctions as often as possible.

Needless to say the bidder with the highest bid receives the auctioned goods, inasmuch as the method is used in the field of Internet auctions. If it is used in other fields, for example in gambling, the highest bidder could also receive an amount of money, tokens, trips or similar.

Finally provision is also made that individual auctions are originated by a third-party, for whom the opportunities to do this have been set up by the auction operator. Here the third party receives for his auctioned goods the end value as a purchase price and a proportion of the charges paid for the bids. In this manner the operator of the method can offer a wider and thus more attractive range of goods.

The method steps of the preferred form of embodiment are executed on a computer that is equipped with a storage medium and a processor, which executes the data and algorithms held on the storage medium such that the method according to the invention progresses. The method could alternatively be executed by means of special hardware components with hard-wired logic.

The invention claimed is:

1. A non-transitory processor-readable medium storing code representing instructions configured to cause a processor to:
   receive, at an auction operator, a first signal prior to a first time indicating that a first user has purchased a first bid for a first amount;
   receive, at the auction operator, a second signal prior to the first time indicating that a second user has purchased a second bid for a second amount;
   receive, at the auction operator, a third signal, after the first time but before a second time, indicating that the first user has submitted the first bid in an auction for an item, the auction initiated by a third user, the second time being subsequent the first time;
   increase an instantaneous value of the item by a predetermined amount in response to the third signal, the instantaneous value being equal to a first value of the item after the second time and before a third time, the third time being subsequent the second time;
   receive, at the auction operator, a fourth signal at the third time indicating that the second user has submitted the second bid in the auction for the item;
   increase the instantaneous value of the item by the predetermined amount in response to the fourth signal, the instantaneous value being equal to a second value of the item after the third time;
   award the item to the second user for the second value in response to a timer expiring before a third bid is submitted; and
   provide the third user with a portion of the first amount and a portion of the second amount in response to the timer expiring.

2. The non-transitory processor-readable medium of claim 1, wherein an amount of time associated with the timer is variable.

3. The non-transitory processor-readable medium of claim 1, wherein the third signal is submitted by a bidding program, the bidding program including a selectable range of values between a lower limit and an upper limit, the bidding program to submit bids in the auction when the instantaneous value of the item is within the selectable range of values, the lower limit having a value greater than or equal to the instantaneous value at the time the lower value is selected.

4. The non-transitory processor-readable medium of claim 1, wherein an unlimited number of bidding programs can be activated by the first user to bid in the auction for the item.

5. The non-transitory processor-readable medium of claim 1, further comprising code representing instructions to cause the processor to:
   receive, at the auction operator, a fifth signal indicating that the first user has purchased a fourth bid for a third amount, the code representing instructions to cause the processor to provide the third user with the portion of the first amount and the portion of the second amount but not to provide the third user with a portion of the third amount in response to the timer expiring.

6. The non-transitory processor-readable medium of claim 1, wherein the auction is a first auction, the code further comprising code representing instructions to cause the processor to:
   receive, at the auction operator, a fifth signal indicating that the first user has purchased a fourth bid for a third amount, the first user retaining the fourth bid for use in a second auction.

7. The non-transitory processor-readable medium of claim 1, wherein a serial number is associated with the second user, the non-transitory processor-readable medium further comprising code representing instructions to cause the processor to:
   increase the serial number by a first predetermined amount based on awarding the item to the second user; and
   decrease the serial number by a second predetermined amount after an expiry of a specific time period, the second user being unable to take part in new auctions when the serial number is greater than a serial number threshold.

8. The non-transitory processor-readable medium of claim 1, wherein the second user does not pay the second value if the auction ends at a specific time.

9. The non-transitory processor-readable medium of claim 1, wherein the first user receives a number of free bids for each bid purchased.

10. The non-transitory processor-readable medium of claim 1, wherein the code representing instructions to cause the processor to provide the third user with the portion of the first amount and the portion of the second amount includes code to provide the third user with a portion of the second value.

11. The non-transitory processor-readable medium of claim 1, further comprising code representing instructions to:
reset the timer associated with the auction to a fixed amount of time in response to the third signal; and
reset the timer associated with the auction to the fixed amount of time in response to the fourth signal.

12. The non-transitory processor-readable medium of claim 1, wherein the code representing instructions to cause the processor to award the item to the second user includes code representing instructions to award the item to the second user without the second user paying the second value.

13. A non-transitory processor-readable medium storing code representing instructions to cause a processor to:
receive, prior to a first time, a first signal indicating that a first user is initiating an auction for an item;
receive, prior to the first time, a second signal indicating that a second user has purchased a first plurality of bids costing a first amount;
receive, prior to the first time, a third signal indicating that a third user has purchased a second plurality of bids costing a second amount;
receive, after the first time but before a second time, a plurality of signals indicating that the second user has used the first plurality of bids and the third user has used the second plurality of bids in the auction for the item;
award the item to the second user at the second time; and
provide the first user with a portion of the first amount and a portion of the second amount after the second time.

14. The non-transitory processor-readable medium of claim 13, further comprising code representing instructions to:
increase an instantaneous value by a predetermined amount in response to receiving each signal from the plurality of signals such that the instantaneous value is equal to an end value at a second time, the second user not being charged the end value in response to being awarded the item.

15. The non-transitory processor-readable medium of claim 13, further comprising code representing instructions to:
increase an instantaneous value by a predetermined amount in response to receiving each signal from the plurality of signals such that the instantaneous value is equal to an end value at a second time, the second user being charged the end value in response to being awarded the item.

16. The non-transitory processor-readable medium of claim 13, further comprising code representing instructions to:
initiate the auction for the item at the first time, an amount of time between the first time and the second time depending on a number of bids from the first plurality of bids and a number of bids from the second plurality of bids.

* * * * *